US012344030B2

(12) United States Patent
Haynes et al.

(10) Patent No.: US 12,344,030 B2
(45) Date of Patent: Jul. 1, 2025

(54) MOULDED ARTICLE WITH DECORATIVE SURFACE

(71) Applicant: Zinniatek Limited, Auckland (NZ)

(72) Inventors: Andrew Leo Haynes, Auckland (NZ); James Francis Sauter, Cleburne, TX (US); Justin Jason Rosaria, Auckland (NZ)

(73) Assignee: Zinniatek Limited (NZ)

( * ) Notice: Subject to any disclaimer, the term of this patent is extended or adjusted under 35 U.S.C. 154(b) by 91 days.

(21) Appl. No.: 18/083,737

(22) Filed: Dec. 19, 2022

(65) Prior Publication Data

US 2023/0191830 A1 Jun. 22, 2023

Related U.S. Application Data

(60) Provisional application No. 63/292,498, filed on Dec. 22, 2021.

(51) Int. Cl.

| | |
|---|---|
| ***B44F 9/02*** | (2006.01) |
| ***B44F 9/04*** | (2006.01) |
| ***B44F 9/12*** | (2006.01) |
| ***E04D 1/16*** | (2006.01) |
| ***E04D 1/18*** | (2006.01) |
| ***E04D 1/20*** | (2006.01) |

(52) U.S. Cl.

CPC .................. *B44F 9/02* (2013.01); *B44F 9/04* (2013.01); *B44F 9/12* (2013.01); *E04D 1/16* (2013.01); *E04D 1/18* (2013.01); *E04D 1/20* (2013.01)

(58) Field of Classification Search

CPC ...... B44F 9/02; B44F 9/04; B44F 9/12; E04D 1/16; E04D 1/18; E04D 1/20

See application file for complete search history.

(56) References Cited

U.S. PATENT DOCUMENTS

| | | | |
|---|---|---|---|
| 3,593,479 | A | 7/1971 | Hinds et al. |
| 5,249,402 | A | 10/1993 | Crick et al. |
| 2006/0130419 | A1 | 6/2006 | Bowman |
| 2007/0137127 | A1 | 6/2007 | Lincoln et al. |

FOREIGN PATENT DOCUMENTS

| | | | |
|---|---|---|---|
| CA | 2332671 | A1 | 7/2002 |
| WO | WO-2016/088026 | A1 | 6/2016 |

OTHER PUBLICATIONS

Extended European Search Report on EP Appl. No. 22214709.2, dated Apr. 25, 2023, 6 pps.

*Primary Examiner* — Mark R Wendell

(74) *Attorney, Agent, or Firm* — FOLEY & LARDNER LLP

(57) ABSTRACT

A moulded article is provided with a presentation side surface and a non-presentation side surface, where the presentation side surface provides for a pre-determined surface decoration, and the non-presentation side surface is an opposing face to the presentation side surface. The non-presentation side surface includes one or more structure(s), where the one or more structure(s) are arranged or positioned to provide or contribute the pre-determined surface decoration of the presentation side surface.

30 Claims, 12 Drawing Sheets

MOULDED ARTICLE WITH DECORATIVE SURFACE

CROSS-REFERENCE TO RELATED PATENT APPLICATIONS

This application claims the benefit of priority to U.S. provisional patent application No. 63/292,498 having a filing date of Dec. 22, 2021, the complete disclosure of which is hereby incorporated by reference for all purposes.

TECHNICAL FIELD

This disclosure relates to a moulded article having a presentation or decorative surface, and a non-presentation surface. The non-presentation surface may have one or more structures that contribute to the presentation or decorative surface.

BACKGROUND

Depending upon the use of a moulded article or product, such an article or product (or component of a product) may include a presentation surface and an opposing non-presentation or underside surface. The presentation surface may include a surface which provides for surface decoration or pattern and ornament which is desired for presentation. An underside of the presentation surface can include structural features to support or strengthen the article.

For example, where such an article may be a sheet or cladding or a roofing module or siding, there is an exposed or decorative side surface providing for certain visual features or aesthetic appearance. The underside surface may include reinforcement features such as supporting structures, disposed thereon to support or stand-off the article from a building surface or from other structures to which the article is to be attached.

However, the shape or pattern of the reinforcement features on the underside surface may be somewhat visually apparent on the presentation surface. Such appearance is undesired and contributes to unwanted aesthetics of the presentation side surface.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY

It is an object of this disclosure to provide a moulded article which goes at least some way towards overcoming one or more of the abovementioned problems or difficulties, or to provide the industry/public with a useful choice.

For example, differential shrinkage rates between different materials or different thicknesses of material of a moulded article can become apparent visually on surfaces of a moulded article. Such differential shrinkage is typically avoided by those skilled in the art by designing forming tools to minimise this undesirable result.

Variations in thickness of material caused by the intersection of joints in a moulded article, or corners, for example where a wall section joins substantially transversely (or at other angles) to a surface, may result in varying or different levels or rates of shrinkage or other changes in material properties during forming of the moulded articles, such as when cooling the moulded article after being formed. Those skilled in the art of aware of this issue, and controlled cooling procedures are often adopted in a post-moulding operation (for example, keeping the article warm and slowly allowing for cooling).

As a result, the utilisation of moulded features on an underside surface of a moulded article may impart or bleed through or become evident on the presentation surface of the article. The imparting or bleed through may conflict with the presentation surface, for example by contrasting with a pattern or texture to be provided on the presentation surface. This is highly undesirable and unwanted as the contrast in pattern or texture, or other surface appearances can conflict with the intended presentation surface aesthetics. For example, where a moulded article is intended to have a natural surface appearance, such as a wooden grain or stone (e.g., slate) appearance, the bleed-through or imparting of a geometric pattern (i.e., highly man-made appearance, or regular and repeating pattern) from the underside surface of any supporting structure would conflict with the intended natural appearance of the presentation surface.

Examples of moulded articles may include building or finishing materials, including roofing modules, weather boards, decking, artificial stone or brick, and may also include furniture, appliances, and vehicle parts or components, including automotive, train, or aircraft parts. Generally, moulded articles may include plastic or rubber articles, ceramic articles such as tiles or shingles, metal articles, or any article where a contrast or change is observed due to a change in material properties, such as differential shrinkage when cooling or drying of the material forming the article.

However, the present invention intends to utilise what are otherwise considered defects due to differential shrinkage, and instead use differential shrinkage to enhance the appearance or topography of a desired presentation surface.

For example, reinforcement features may comprise one or more ribs or thickened structures, or dimples or feet structures, providing support to the moulded article and/or the presentation surface. However, a variation in thickness of material caused by the forming of the reinforcement features may result in varying levels of shrinkage or other changes in material properties during forming of the moulded articles, such as when cooling the moulded article after being formed.

In accordance with at least one of the embodiments disclosed herein, in a first aspect there is provided a moulded article providing for a presentation side surface and a non-presentation side surface, wherein the presentation side surface provides for a pre-determined surface decoration, and the non-presentation side surface is a substantially opposing face to the presentation side surface, wherein the non-presentation side surface comprises one or more structure(s), the one or more structure(s) arranged or positioned to substantially provide or contribute the pre-determined surface decoration of the presentation side surface.

The non-presentation side surface may be a reinforcement side surface.

The presentation side surface may comprise of one or more pre-determined surface decoration feature(s).

The one or more structure(s) may be arranged about the non-presentation side surface in a substantially complementary manner of the one or more pre-determined surface decoration feature(s) of the presentation side surface.

The one or more structure(s) may be one or more reinforcement feature(s).

The one or more structure(s) may be one or more of: substantially solid, substantially partially solid or partially hollow type structure(s), or substantially hollow type structure(s).

The presentation side surface may provide for one or more pre-determined surface decoration feature(s), and the non-presentation side surface (such as a reinforcement side surface) may be a substantially opposing face to the presentation side surface, wherein the non-presentation side surface (such as the reinforcement side surface) may comprise one or more structure(s) (such as one or more reinforcement feature(s)), the one or more structure(s) (such as the one or more reinforcement feature(s)) may be arranged in a substantially complementary manner of one or more of the pre-determined surface decoration feature(s) of the presentation side surface.

In a second aspect, there is provided a moulded article providing for a presentation side surface and a reinforcement side surface, wherein the presentation side surface provides for pre-determined surface decoration feature(s), and the reinforcement side surface is a substantially opposing face to the presentation side surface, wherein the reinforcement side surface comprises one or more reinforcement feature(s), the one or more reinforcement feature(s) arranged in a substantially complementary manner of one or more of the pre-determined surface decoration feature(s) of the presentation side surface.

The reinforcement features may comprise one or more stand-offs, or ribs, or thickened portions (including but not limited to dimples or feet type structures), which may extend (i.e., extending) from the reinforcement side surface.

The stand-offs, or ribs, or thickened portions (including but not limited to dimples or feet type structures) may vary in one or more of a height and/or width and/or length and/or position to complement one or more of the decoration features of the presentation side surface.

The presentation side surface may comprise a non-presentation portion, the non-presentation portion configured to be substantially covered by at least a portion of a second or further moulded article.

The presentation side surface may comprise an underlapping region and an overlapping region, the overlapping region including the decoration features of the presentation side surface, and configured to overlap the underlapping region of a second or further moulded article.

The reinforcement feature(s) may be provided about the reinforcement side surface in a manner to substantially transpose or impart or influence the topology of the presentation side surface.

The reinforcement feature(s) may be substantially aligned with decoration features of the presentation side surface or may be arranged about the reinforcement side surface in a manner so as to substantially complement or accentuate one or more of the decoration features of the presentation side surface.

A positioning of the pre-determined surface decoration features and/or the reinforcement features may provide for a compensation for a differential shrinkage rate of one or more portions of the moulded article.

The moulded article may be formed of a mouldable material, such as, but not limited to one or more of: polymeric materials, plastics, glass, ceramics, metals.

The moulded article may be formed via a continuous forming process.

The reinforcement features may be provided to be of a sufficient height or extension from the reinforcement side surface so as to make contact with a surface upon which the one or more reinforcement features are to be supported upon, such as a building surface, and/or, not make contact, or avoids contact, with a surface upon which the one or more reinforcement features are to be supported upon, such as a building surface, and/or a combination of the above.

The reinforcement features may comprise a plurality of discontinuous rib portions arranged about the reinforcement side. Such reinforcement features may include, but are not limited to, dimples or feet type structures, and may be in the form of an elongated type structure, such as ribs, although the reinforcement structures may be of any suitable shape configured to impart or transpose a change in the surface topology or topography or decoration of the presentation side surface. Accordingly, rib portions are one example, and other reinforcement structure shapes or arrangements can be provided, whether as a series of such shapes or a mixture of shapes and lengths or height type structures, and may be substantially solid or substantially hollow or may be partially solid or partially hollow type structures depending on the quantity of material which is intended to be used in such structures. Such structures may be provided as substantially continuous arrangements extending about the non-presentation side surface or may be provided as discontinuous structures or may be provided as a combination of continuous and discontinuous structures. Such structures may be provided as a series or may be inter-connecting with other such structures, or may be stand-alone structures, or there may be combinations of inter-connecting structures and stand-alone structures.

The reinforcement features may comprise a plurality of continuous rib portions arranged about the reinforcement side, which may extend substantially continuously about the reinforcement side.

The reinforcement features may be a series of rib portions.

The reinforcement features may be a series of inter-connecting rib portions.

The reinforcement features may be configured or arranged about the reinforcement side to mimic a desired decoration or appearance of the presentation side.

The desired decoration or appearance of the presentation side may be at least one or more of: a natural material surface finish or appearance, such as natural products, slate, wood or wooden grain (or split wood, such as a wooden shingle), animal skin (such as leather), stone, bark, leaves, plants (or vegetation), flowers.

The desired decoration or appearance of the presentation side may be at least one or more of: a man-made shape, a material surface finish or appearance, such as man-made products, asphalt, shingle, wood or wood grain, stone or stone chips, cloth or woven material, glass, dimpled glass, carbon fibre or other fibrous appearance materials, glass fibre, matting, metal.

The moulded article may be configured to be one or more of:

not joined together or not in contact with another moulded article, substantially adjacent to, or abutting of, another moulded article, provided as an individual surface, provided as a complete surface or a component part surface, provided as part of or an accent to a surface, provided as part of a change in a surface.

In a third aspect, there is provided a roofing or siding shingle or module comprising of a plurality of said moulded articles as defined in any one of the abovementioned aspects, wherein the plurality of moulded articles are enjoined with each other via the shingle or module as a unit providing for a plurality of individual or separately presentable surfaces, each presentable surface comprising of a different arrangement or patterning of reinforcement features on the reinforcement side surface in a manner to complementarily support the shingle or module upon a surface and the decoration features of the presentation side surface.

Each said moulded article may be formed of substantially the same quantity or volume of mouldable material.

Each said moulded article of the plurality of moulded articles of a said module, may provide for a substantially unique presentation side surface and non-presentation side surface.

In a fourth aspect there is provided a system of a plurality of shingle or modules as defined in any one of the abovementioned aspects, wherein the plurality of shingles or modules are arranged as an array of substantially overlapping shingles or tiles to provide coverage of a surface to which the shingle or modules are to be affixed or supported therefrom.

In a fifth aspect, there is provided a method of forming a moulded article, the method comprising:

- forming a presentation side surface and a non-presentation side surface of the moulded article,
- the presentation side surface providing for a pre-determined surface decoration, and
- the non-presentation side surface being a substantially opposing surface of the presentation side surface, and
- forming one or more structure(s) on the non-presentation side surface, the one or more structure(s) arranged or positioned to substantially provide or contribute the pre-determined surface decoration of the presentation side surface.

In a sixth aspect, there is provided a method of manufacture of a moulded article, the method comprising: providing to a continuous forming machine a continuous or substantially continuous feed of material able to assume and retain a form after being moulded between a first forming surface and a second forming surface; allowing the formation to take place as such surfaces are advanced in the same machine direction; wherein the output is a moulded article providing for a presentation side surface and a non-presentation side surface, wherein the presentation side surface provides for a pre-determined surface decoration, and the non-presentation side surface is a substantially opposing face to the presentation side surface, wherein the non-presentation side surface comprises one or more structure(s), the one or more structure(s) arranged or positioned to substantially provide or contribute the pre-determined surface decoration of the presentation side surface.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth. Any of the aforementioned features, embodiments or aspects may be combined with one or more of the other features or embodiments or aspects as described herein.

The term 'moulded' as used in this specification and claims is intended to broadly mean, unless the context suggests otherwise, any article that may be formed of or from a substantially mouldable material (this may include pliable materials in a liquid or molten state or condition and which may cure or harden or otherwise set or solidify), including, but not limited to, polymeric materials, plastics, glass, ceramics, rubber, metals, metals including castings, resins, and/or compositions.

The term 'complementary' as used in this specification and claims is intended to broadly mean, unless the context suggests otherwise, to substantially transpose or impart or contribute to or enhance or emphasise or provide or influence the topology (or topography) or appearance (visually or aesthetically) of the presentation side surface, or one or more decoration features to the presentation side surface of the moulded article. In this manner, the one or more structure(s) arranged about or on the non-presentation side surface (or the reinforcement side surface) can provide for the pre-determined surface decoration or may contribute to surface decoration features which are additionally formed or moulded into the presentation side surface itself, for example to substantially enhance, improve or accentuate one or more of the decoration(s) or decoration feature(s) of the presentation side surface.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The disclosure consists in the foregoing and also envisages constructions of which the following gives examples only. Features disclosed herein may be combined into new embodiments of compatible components addressing the same or related inventive concepts.

BRIEF DESCRIPTION OF THE DRAWINGS

Preferred embodiments of the disclosure will be described by way of example only and with reference to the following drawings.

DETAILED DESCRIPTION

Figure 1A:
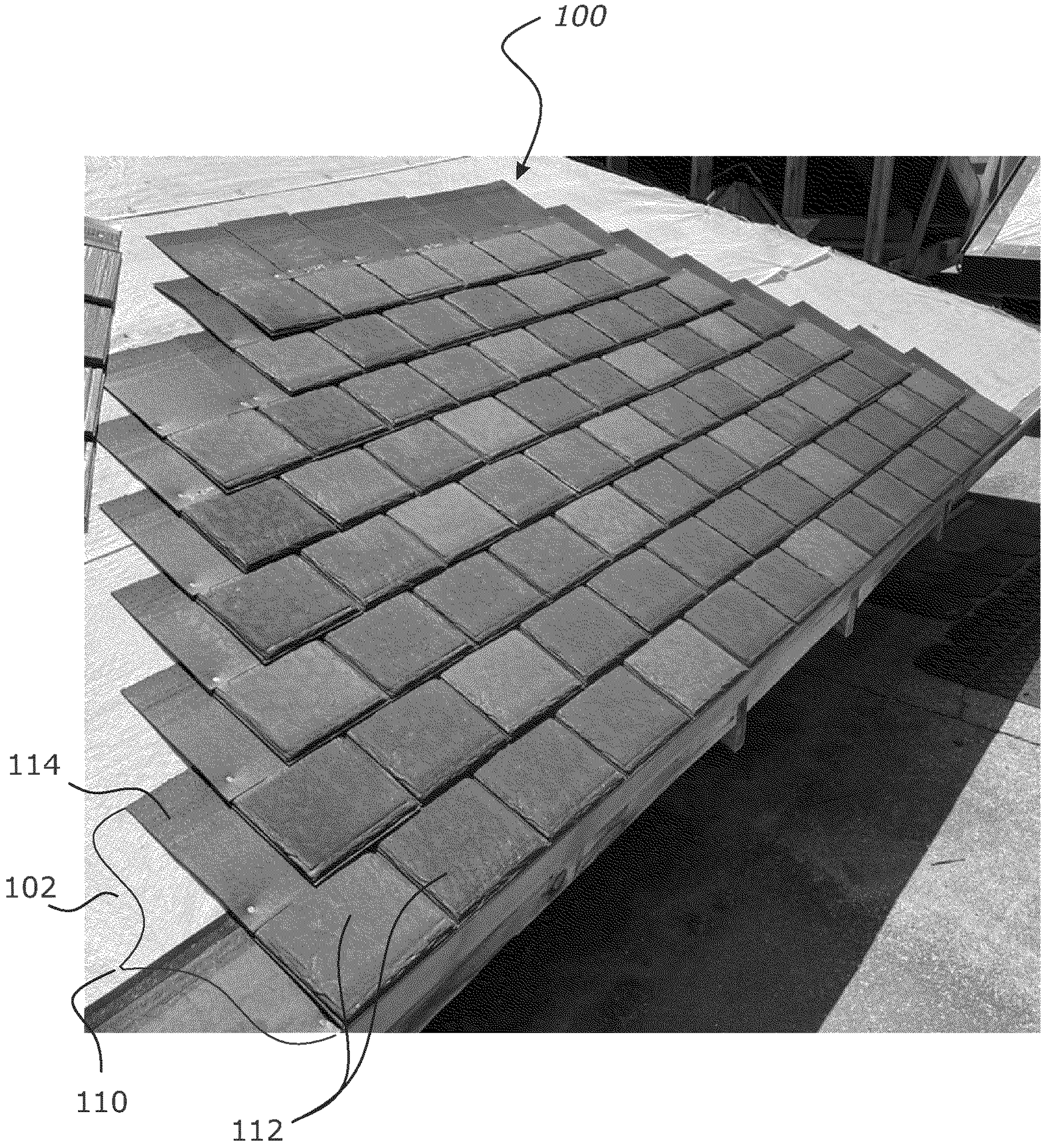
FIGS. 1A and 1B show a collection of moulded articles in the form of roofing modules, installed on a building surface.

Various embodiments are described with reference to the Figures. Throughout the Figures and specification, the same reference numerals may be used to designate the same or similar components, and redundant descriptions thereof may be omitted.

Figure 1B:
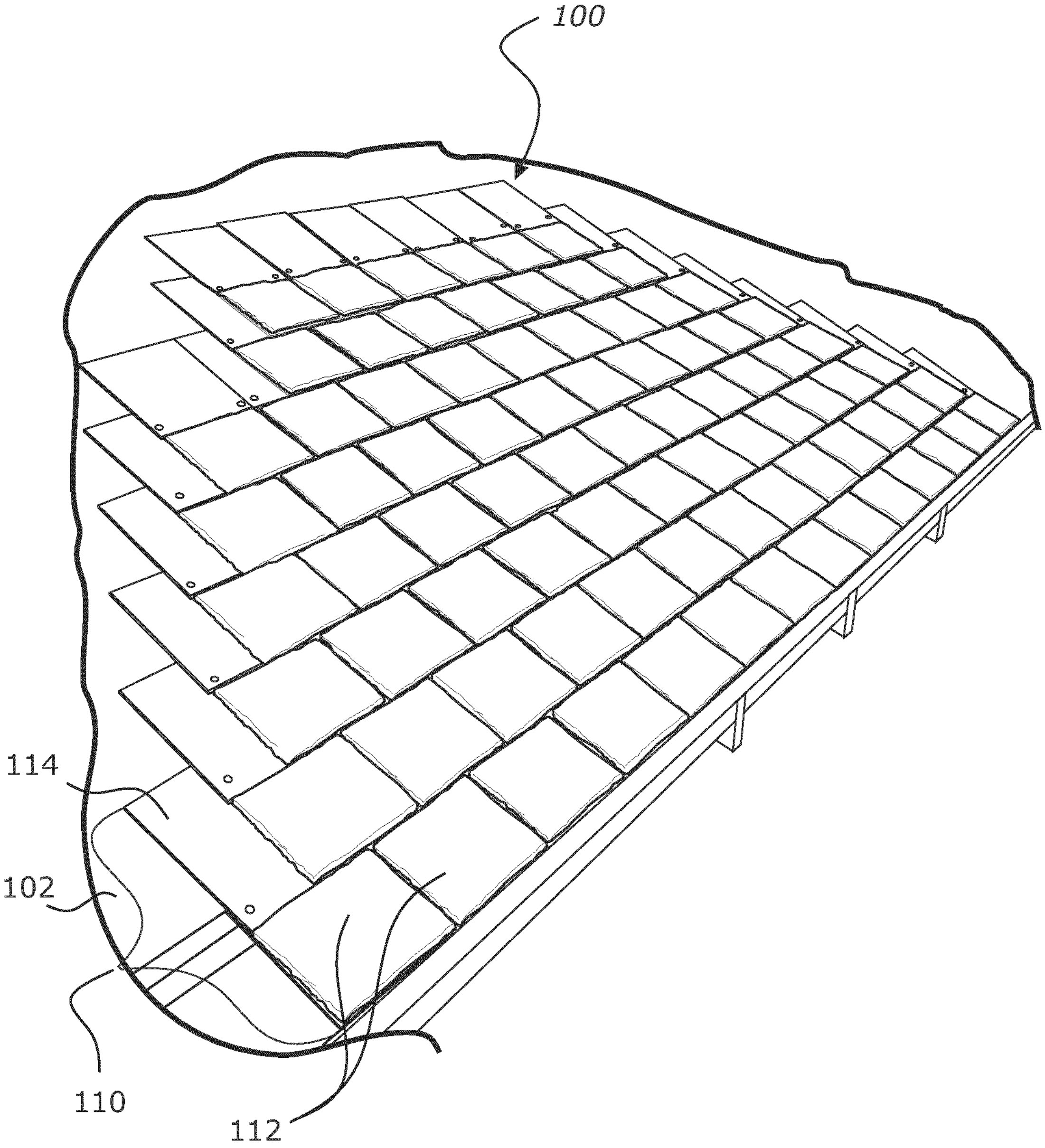

FIG. 1A shows an example embodiment of a roofing system 100 including a number of moulded articles 110 as disclosed herein installed on a building surface 102. FIG. 1B shows a line version of FIG. 1A.

FIGS. 2A-2C, and 3A-3C show example embodiments of a moulded article 110 as disclosed herein. The moulded article 110 provides for a presentation side surface 120, 130 and a reinforcement side surface 124, 134. The presentation side surface 120, 130 provides for pre-determined surface decoration features 122, 132, and the reinforcement side surface 124, 134 is a substantially opposing face to the presentation side surface 120, 130.

Figure 2A:
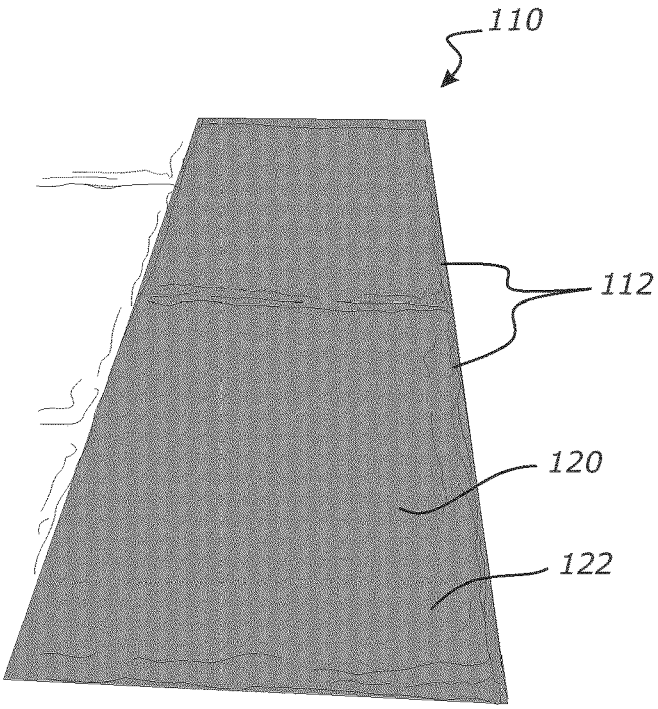
FIGS. 2A, 2B, and 2C show an example of a moulded article with structures providing or contributing a pre-determined surface decoration on a presentation side surface.
Figure 2B:
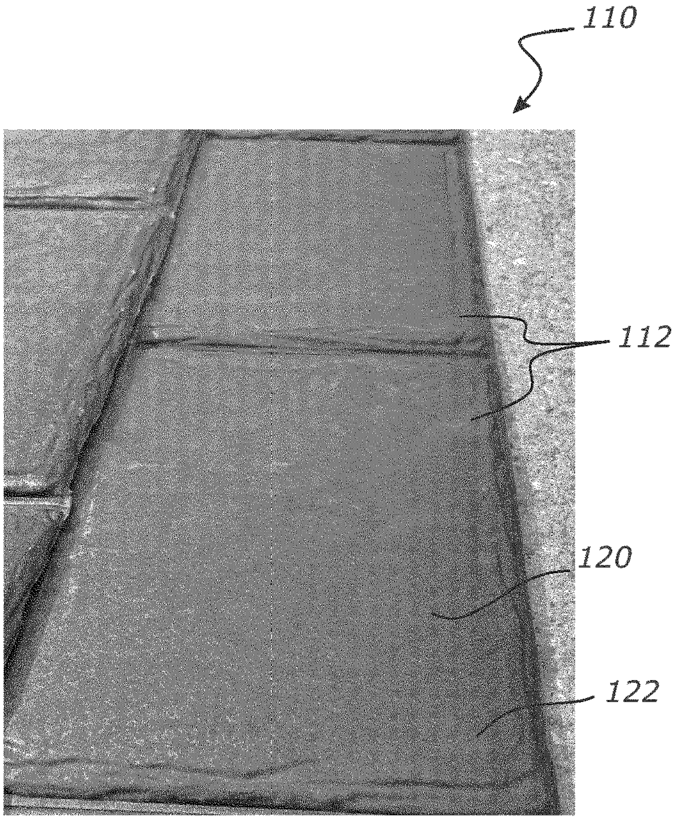
Figure 2C:
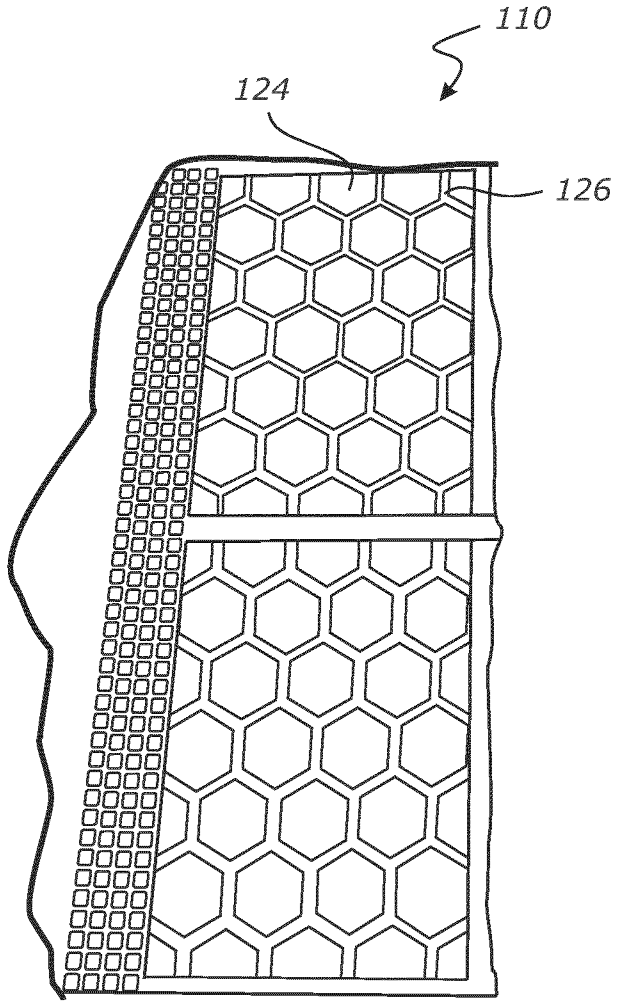
Figure 3A:
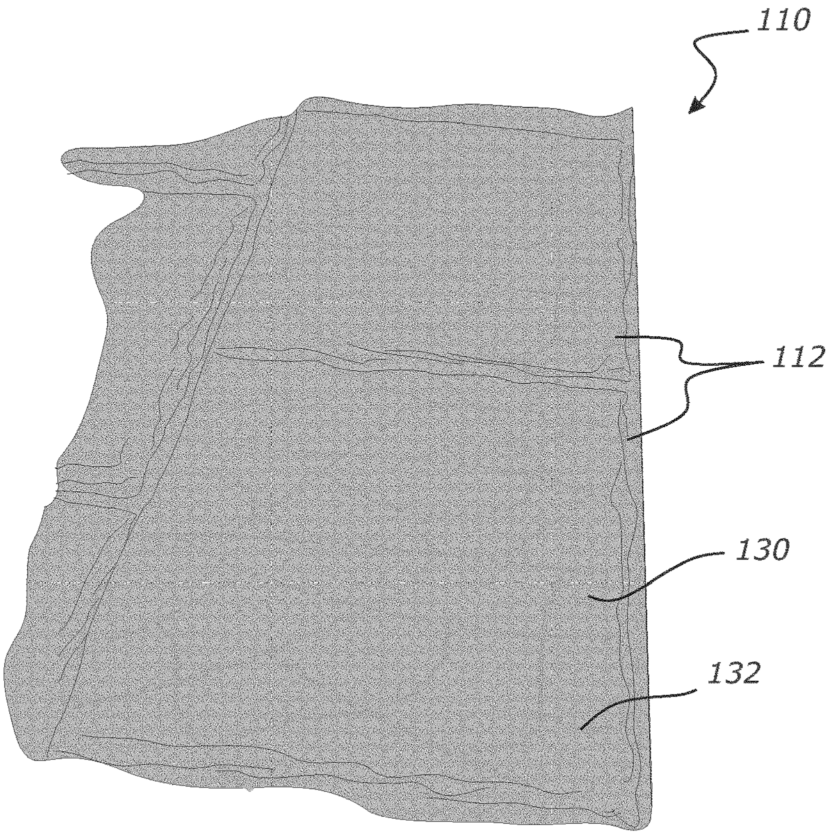
FIGS. 3A, 3B, and 3C show an example of a moulded article with structures providing or contributing a pre-determined surface decoration on a presentation side surface.
Figure 3B:
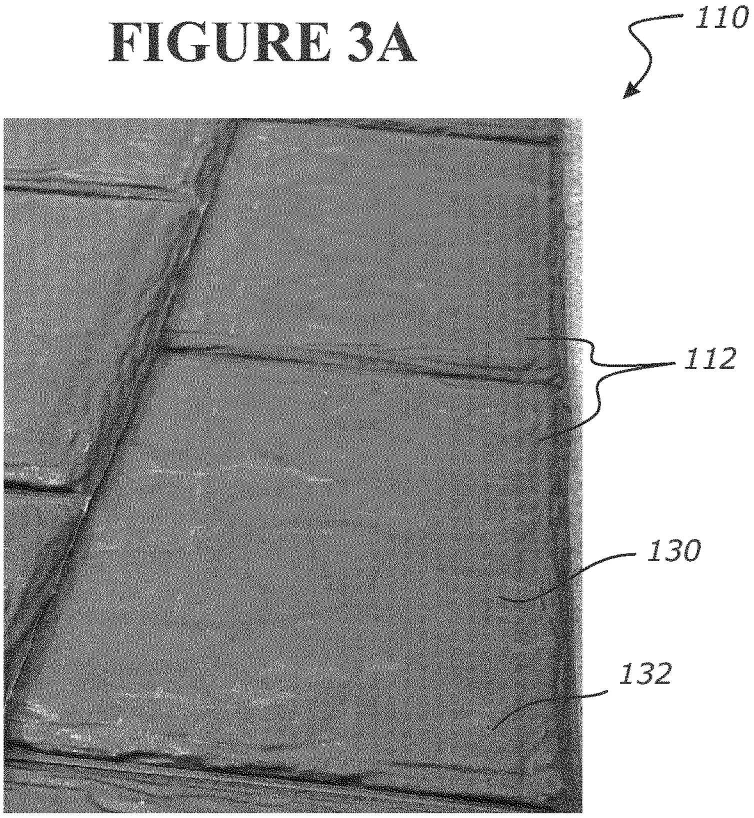
Figure 3C:
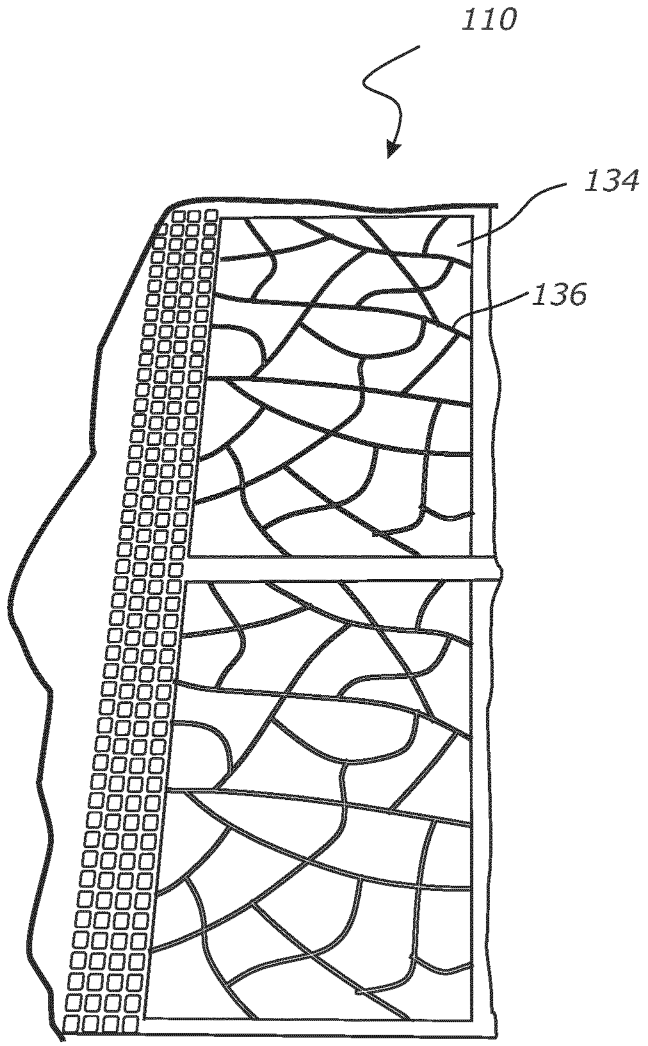

As shown in FIGS. 2C and 3C, the reinforcement side surface 122, 132 comprises one or more reinforcement features 126, 136.

In an example embodiment shown in FIGS. 2A-2C, the one or more reinforcement features 126 are arranged in a geometric pattern. Due to variation in material thickness and changes in material properties, the reinforcement features 126 may impart a corresponding geometric pattern to the presentation side surface 120, thereby forming part of the surface decoration features 122.

In the example embodiment shown in FIGS. 3A-3C a moulded article 110 is shown providing for a presentation side surface 130 and a non-presentation side surface 134, wherein the presentation side surface 130 provides for a pre-determined surface decoration 132, and the non-presentation side surface 134 is a substantially opposing face to the presentation side surface 130. The non-presentation side surface 134 comprises one or more structure(s) 136, the one or more structure(s) 136 arranged or positioned to substantially provide or contribute the pre-determined surface decoration 132 of the presentation side surface 130.

In an example embodiment, the non-presentation side surface 134 may be a reinforcement side surface. The presentation side surface 130 may comprise of one or more pre-determined surface decoration feature(s) 132, and the one or more structure(s) may be arranged about the non-presentation side surface 134 in a substantially complementary manner of the one or more pre-determined surface decoration feature(s) 132 of the presentation side surface 130.

The one or more structure(s) 136 may be one or more reinforcement feature(s), for example the one or more structure(s) 136 may be one or more of: substantially solid, substantially partially solid or partially hollow type structure(s), or substantially hollow type structure(s).

The presentation side surface 130 may provide for one or more pre-determined surface decoration feature(s) 132, and the non-presentation side surface 134 (such as a reinforcement side surface) may be a substantially opposing face to the presentation side surface 130, wherein the non-presentation side surface 134 (such as the reinforcement side surface) may comprise one or more structure(s) 136 (such as one or more reinforcement feature(s)), the one or more structure(s) 136 (such as the one or more reinforcement feature(s)) may be arranged in a substantially complementary manner of one or more of the pre-determined surface decoration feature(s) 132 of the presentation side surface 130.

In the example embodiment shown in FIGS. 3A-3C, the one or more reinforcement features 136 may be arranged in a substantially complementary manner of one or more of the decoration features 132 of the presentation side surface 130. For example, the reinforcement features 136 may be disposed or arranged such that they impart an effect to the pre-determined surface decoration features 132 that is complementary.

In an example, the presentation side surface 130 is an exposed surface or overlapping surface as a first side of a moulded article 110. Additionally, the reinforcement side surface 134 is a substantially opposing non-exposed surface as a second side of the moulded article 110.

In an example, the presentation side surface 130 of the moulded article 110 may be substantially supported by one or a plurality of reinforcement features 136. For example, the reinforcement features 136 may be provided on the reinforcement side surface 134. In an example, the reinforcement side surface 134 may comprise reinforcement features 136 in the form of support structures, for example, the reinforcement side surface 134 may present one or a plurality of support ribs.

The presentation side surface 130 may comprise a pre-determined surface decoration 132, which may present a desired aesthetic appearance.

In an example, the pre-determined surface decoration 132 may comprise a surface profile, morphology, topology or topography to present a desired aesthetic appearance.

In an example, the pre-determined surface decoration 132 may be complemented by reinforcement features 136 provided on a non-presentation side, i.e., the reinforcement side surface 134. In an example, the reinforcement features 136 may be disposed or arranged such that they impart an enhancement to the pre-determined surface decoration 132 of the presentation side surface 130.

For example, the reinforcement features 136 or support structures may be configured, disposed or arranged to impart a pattern or decoration to the presentation side surface 130.

In an example embodiment, the pre-determined surface decoration 132 may comprise a surface ornamentation. In an example embodiment, the surface ornamentation may resemble asphalt shingles, slate, wooden shakes, concrete tiles, or the like.

The reinforcement features 136 may comprise one or more stand-offs, or ribs, or thickened portions (including but not limited to dimples or feet type structures), which may extend (or extending) from the reinforcement side surface 134. The stand-offs, or ribs, or thickened portions (including but not limited to dimples or feet type structures) may vary in one or more of a height and/or width and/or length and/or position to complement one or more of the decoration features 132 of the presentation side surface 130.

The presentation side surface 130 may comprise a non-presentation portion 114, the non-presentation portion 114 configured to be substantially covered by at least a portion of a second or further moulded article 110.

The presentation side surface 130 may comprise an underlapping region 114 and an overlapping region, the overlapping region including the decoration features 132 of the presentation side surface, and configured to overlap the underlapping region 114 of a second or further moulded article 110.

The reinforcement feature(s) 136 may be provided about the reinforcement side surface 134 in a manner to substantially transpose or impart or influence the topology of the presentation side surface 130.

The reinforcement feature(s) 136 may be substantially aligned with decoration features 132 of the presentation side surface 130 or may be arranged about the reinforcement side surface 134 in a manner so as to substantially complement or accentuate one or more of the decoration features 132 of the presentation side surface 130.

A positioning of the pre-determined surface decoration features 132 and/or the reinforcement features 136 may provide for a compensation for a differential shrinkage rate of one or more portions of the moulded article 110.

The moulded article 110 as described herein may be formed of a mouldable material, such as, but not limited to one or more of: polymeric materials, plastics, glass, ceramics, metals. The moulded article 110 may be formed via a continuous forming process.

The reinforcement features 136 may be provided to be of a sufficient height or extension from the reinforcement side surface 134 so as to make contact with a surface, such as roof surface 102, upon which the one or more reinforcement features 136 are to be supported upon, such as a building surface, and/or, not make contact, or avoids contact, with a surface upon which the one or more reinforcement features 136 are to be supported upon, such as a building surface, and/or a combination of the above.

The reinforcement features 136 may comprise a plurality of discontinuous rib portions arranged about the reinforcement side 134. The reinforcement features 136 may comprise a plurality of continuous rib portions arranged about the reinforcement side 134, which may extend substantially continuously about the reinforcement side 134. The reinforcement features 136 may be a series of rib portions, and/or a series of inter-connecting rib portions.

The discontinuous rib portions as disclosed herein may be arranged about the reinforcement side 134. Such reinforcement features 136 may include, but are not limited to, dimples or feet type structures, and may be in the form of an elongated type structure, such as ribs, although the reinforcement structures 136 may be of any suitable shape configured to impart or transpose a change in the surface topology or topography or decoration 132 of the presentation side surface 130. Accordingly, rib portions are one example, and other reinforcement structure 136 shapes or arrangements can be provided, whether as a series of such shapes or a mixture of shapes and lengths or height type structures, and may be substantially solid or substantially hollow or may be partially solid or partially hollow type structures depending on the quantity of material which is intended to be used in such structures. Such structures may be provided as substantially continuous arrangements extending about the non-presentation side surface 134 or may be provided as discontinuous structures or may be provided as a combination of continuous and discontinuous structures. Such structures may be provided as a series or may be inter-connecting with other such structures, or may be stand-alone structures, or there may be combinations of inter-connecting structures and stand-alone structures.

The reinforcement features 136 may be configured or arranged about the reinforcement side 134 to mimic a desired decoration or appearance of the presentation side 130, such as surface decoration 132.

The desired decoration or appearance 132 of the presentation side 130 may be at least one or more of: a natural material surface finish or appearance, such as natural products, slate, wood or wooden grain (or split wood, such as a wooden shingle), animal skin (such as leather), stone, bark, leaves, plants (or vegetation), flowers.

The desired decoration or appearance 132 of the presentation side 130 may be at least one or more of: a man-made shape, a material surface finish or appearance, such as man-made products, asphalt, shingle, wood or wood grain, stone or stone chips, cloth or woven material, glass, dimpled glass, carbon fibre or other fibrous appearance materials, glass fibre, matting, metal.

The moulded article 110 may be configured to be one or more of:

- not joined together or not in contact with another moulded article,
- substantially adjacent to, or abutting of, another moulded article,
- provided as an individual surface,
- provided as a complete surface or a component part surface,
- provided as part of or an accent to a surface,
- provided as part of a change in a surface.

In an example embodiment, such as that shown in FIGS. 3A-3C, 5A-C and 6A-B, a roofing or siding shingle or module is shown comprising of a plurality of said moulded articles 110 as described herein, wherein the plurality of moulded articles 110 are enjoined with each other via the shingle or module 110 as a unit providing for a plurality of individual or separately presentable surfaces 132/152, each presentable surface comprising of a different arrangement or patterning of reinforcement features 136/162 on the reinforcement side surface 134/160 in a manner to complementarily support the shingle or module 110 upon a surface and the decoration features 132/152 of the presentation side surface 130/150.

Each said moulded article 110 may be formed of substantially the same quantity or volume of mouldable material, and may provide for a substantially unique presentation side surface 130/150 and non-presentation side surface 134/160.

Turning back to FIGS. 1A and 1B, there is for example, shown a system of a plurality of shingle or modules 100 as described herein, wherein the plurality of shingles or modules are arranged as an array of substantially overlapping shingles or tiles 110 to provide coverage of a surface, such as a roof 102 to which the shingle or modules 110 are to be affixed or supported therefrom.

Figure 4A:
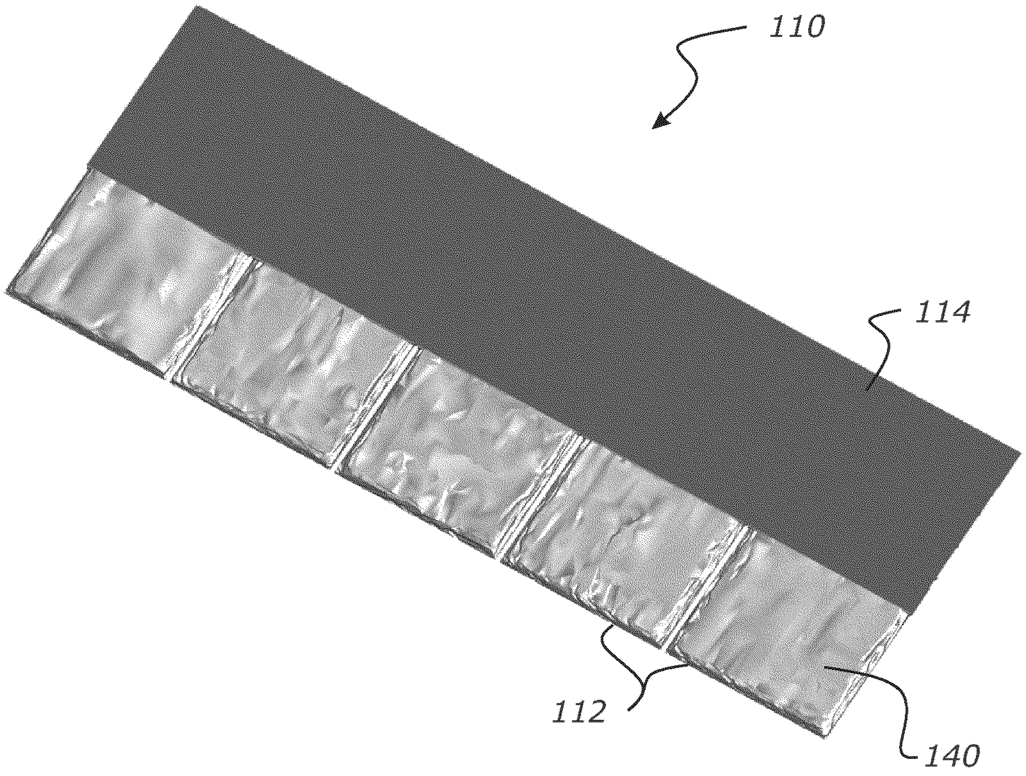
FIGS. 4A and 4B show a perspective and top-down view of a moulded article, including a presentation side surface.
Figure 4B:
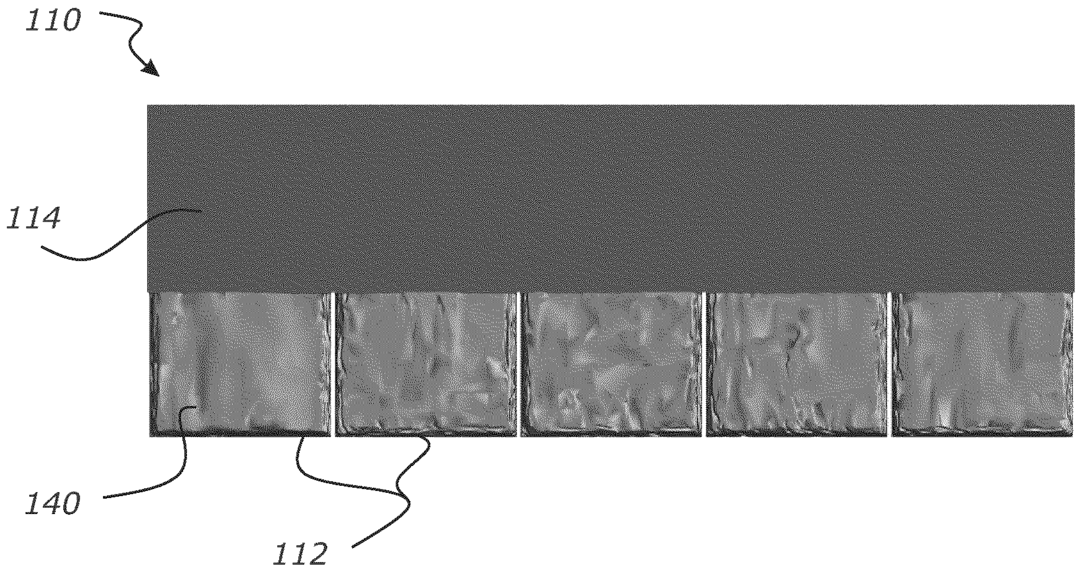

The present invention may be provided as a roofing, cladding, or siding module 110, as shown in FIGS. 4A and 4B.

The module 110 may comprise an underlapping region 114, and an exposed region 140, wherein the underlapping region 114 is adapted to be substantially covered by the exposed region 140 of an adjacent module when installed on a building surface.

The exposed region 140 may substantially correspond with the presentation side surface as described herein.

The module 110 may also comprise an outer surface and an under surface, wherein the under surface of the exposed region 140 comprises one or more reinforcement features as described herein.

The reinforcement features may provide for a stand-off or support structure to lift the module 110 from the building surface.

The module 110 may comprise one or more tabs 112, comprising of separated sections of the exposed region 140.

Figure 5A:
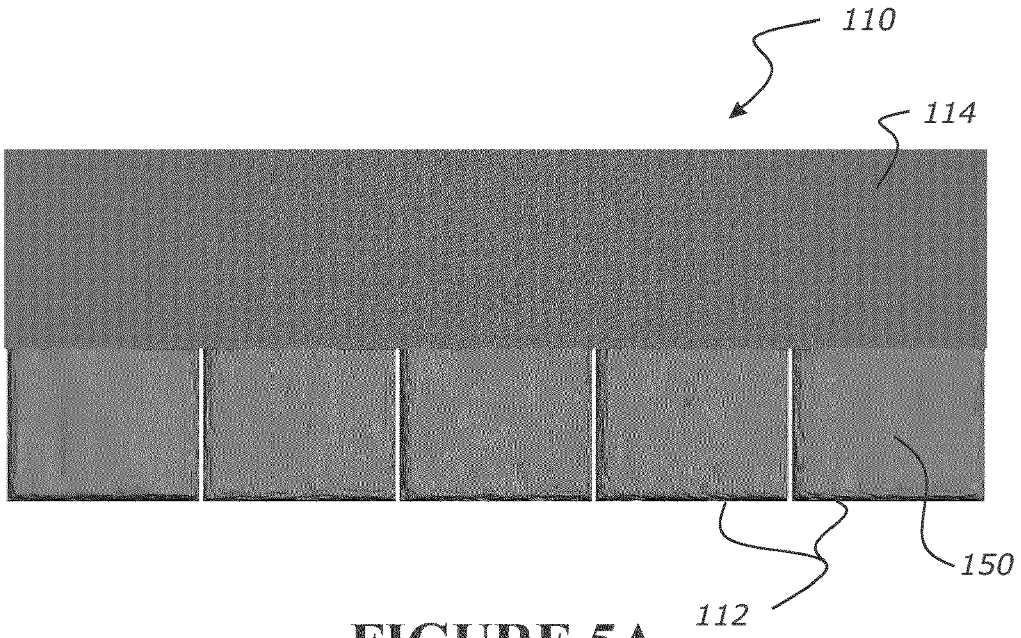
FIGS. 5A, 5B and 5C show an example of how structures of a non-presentation side surface may provide or contribute a pre-determined surface decoration on a presentation side surface.
Figure 5B:
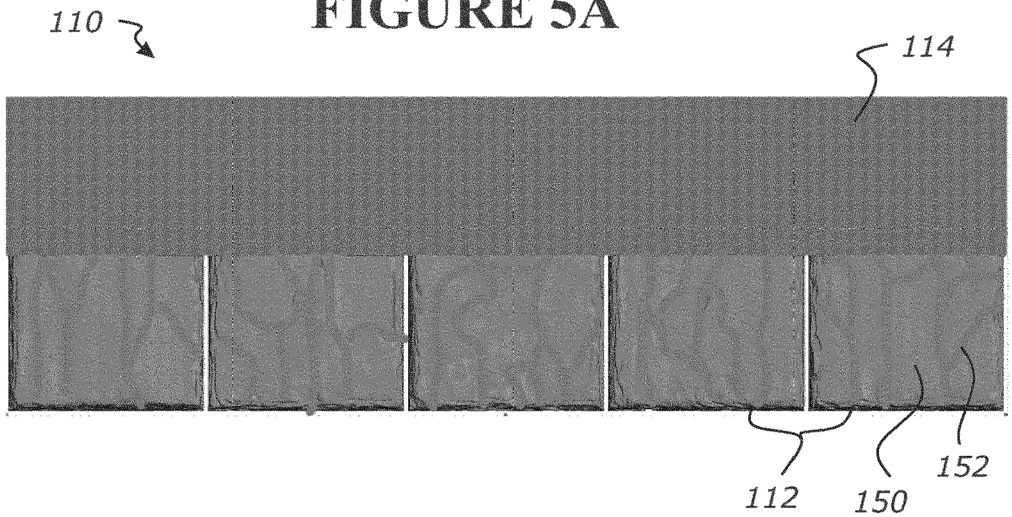
Figure 5C:
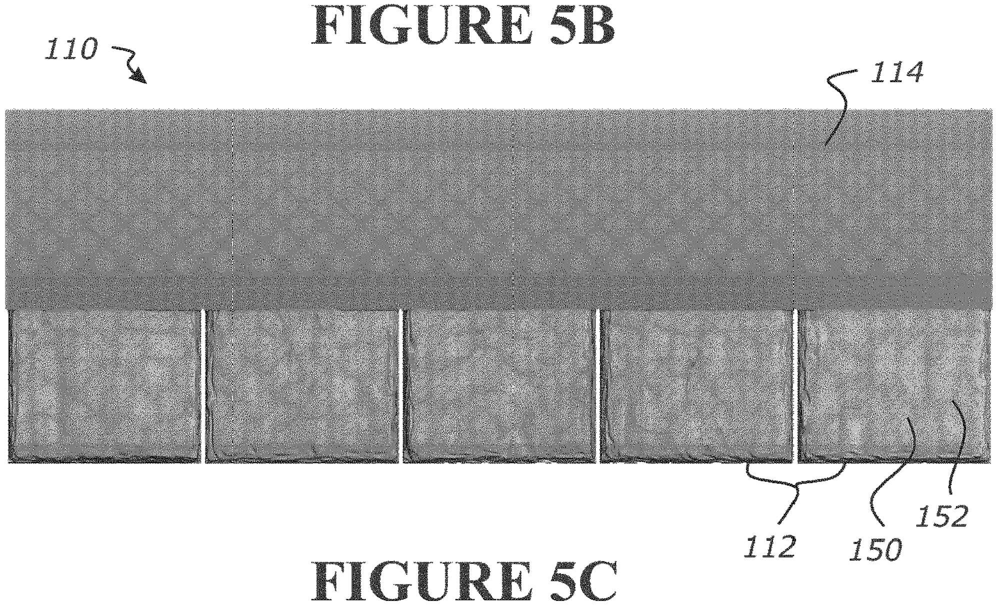

FIGS. 5A, 5B and 5C show an example embodiment of a roofing, cladding or siding module 110 as disclosed herein. The module 110 may comprise an underlapping region 114, and an exposed region 150, and may optionally comprise one or more tabs 112, as described above.

The exposed region 150 may correspond with the presentation side surface as described herein. The module 110 may provide for a presentation side surface 150, and a reinforcement side surface, the reinforcement side surface being a substantially opposing face to the presentation side surface 150. The presentation side surface 150 may provide for pre-determined surface decoration features 152.

In an example embodiment as shown in FIGS. 5B and 5C, the module 110 may comprise reinforcement features on a reinforcement side surface, which are arranged in a substantially complementary manner of the one of more decoration features 152 of the presentation side surface 150. In this example embodiment, the location of the reinforcement features shown in FIG. 5B are highlighted to illustrate the complementary nature of the reinforcement features to the pre-determined surface decoration 152. FIG. 5C illustrates the reinforcement features arranged in a substantially complementary manner of one or more of the decoration features 152 of the presentation side surface 150 without the emphasis of these features as shown in FIG. 5B.

Figure 6A:
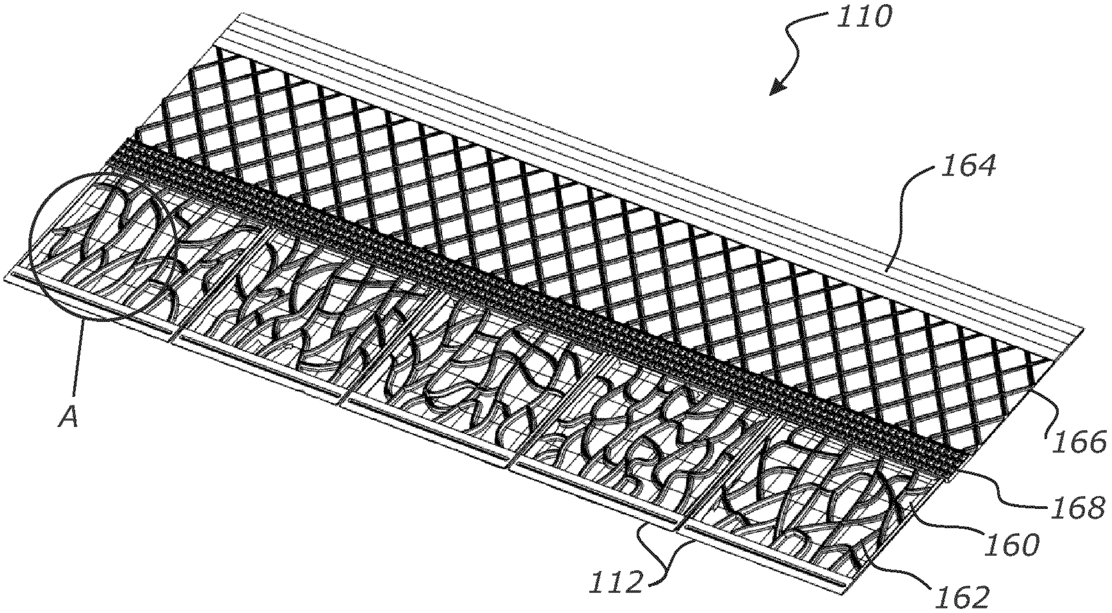
FIGS. 6A and 6B show a non-presentation side surface of an example moulded article, including structures arranged or positioned to substantially provide or contribute pre-determined surface decoration on a presentation side surface.
Figure 6B:
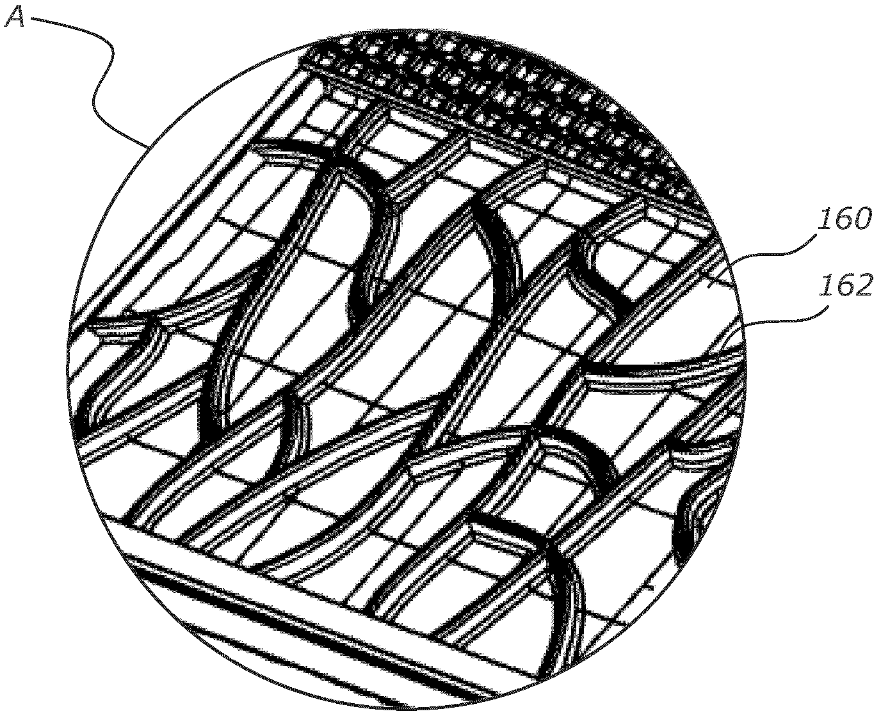

FIGS. 6A and 6B shows an example moulded article 110 as described herein, shown in the form of a roofing, cladding or siding module 110. FIG. 6A shows a module 110, including tabs 112, and with section A of this module shown in FIG. 6B.

FIGS. 6A and 6B show an example embodiment of the reinforcement side surface as described herein. In this example embodiment, reinforcement side surface 160 comprises reinforcement features 162, which may be provided in the form of ribs. The reinforcement features 162 are arranged in a substantially complementary manner of the presentation side surface, such as presentation side surface 150 of FIG. 5C.

The moulded article 110 of FIGS. 6A and 6B may also include a rear surface 166 of underlapping region 114, which may comprise ribs or other reinforcement features or structures. The moulded article 110 may also comprise a lip region 164, comprising one or more lips or glue lines, for example to provide for a weatherproofing or waterproofing when in the form of a roofing, cladding or siding module installed on a roof, or as a cladding or siding.

Figure 7A:
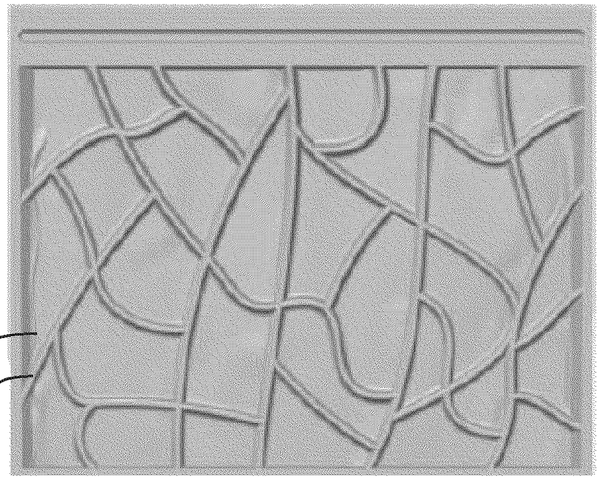
FIGS. 7A, 7B and 7C show various examples of structures on a non-presentation side surface of a moulded article.
Figure 7B:
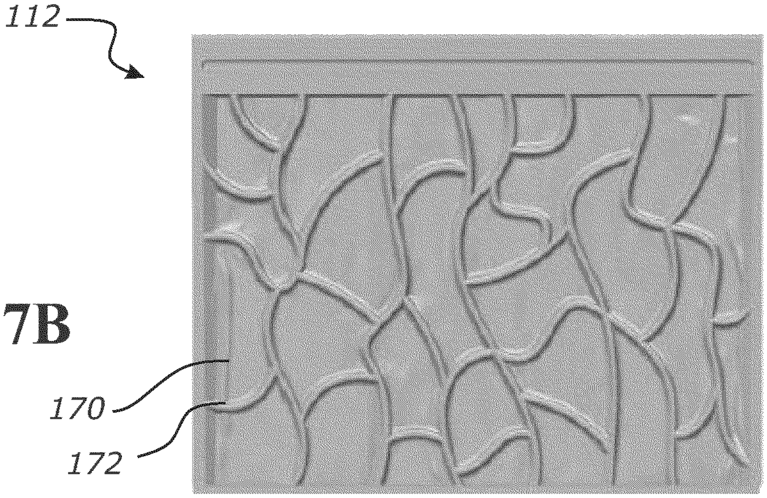
Figure 7C:
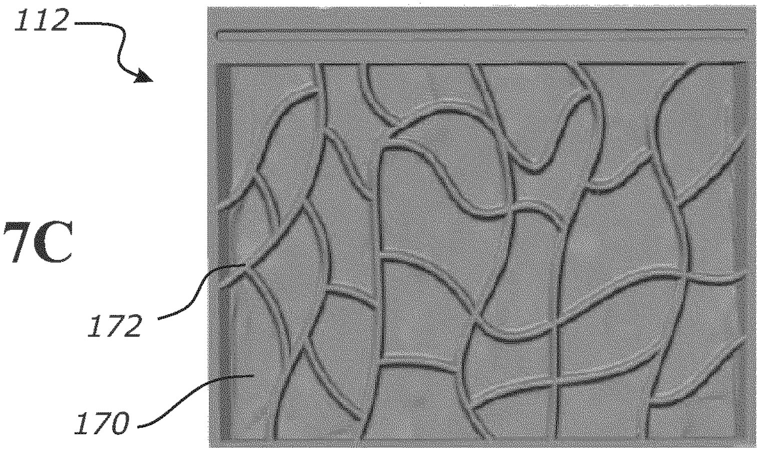

FIGS. 7A, 7B and 7C illustrate example embodiments of reinforcement features 172 provided on a reinforcement side surface 170 as described herein. Each of FIGS. 7A, 7B and 7C show a tab 112 of a module 110, and show a varying arrangement of reinforcement features 172, which may be arranged in a substantially complementary manner of one or more decoration features of the presentation side surface as described herein.

In an example, the reinforcement features, for example features 162 of FIGS. 6A, 6B, or features 172 of FIGS. 7A-C, may define a pathway for air flow between the module 110 and the building surface (such as 102 as shown in FIGS. 1A and 1B). In an embodiment, the reinforcement structures 162/172 are arranged in a manner to (1) create turbulence in the airflow, (2) increase the surface area of the module 110 in contact with the passing airflow compared to a module lacking such a surface pattern, or both (1) and (2). In an embodiment, the reinforcement structures 162/172 comprises a plurality of projections that create a tortuous pathway above the actual or notional plane of the building surface.

The example embodiments shown in FIGS. 1A-7C relate to a slate ornamentation, however it will be understood that the pre-determined surface decoration as described herein may resemble asphalt shingles, slate, wooden shakes, concrete tiles, or the like.

Figure 8A:
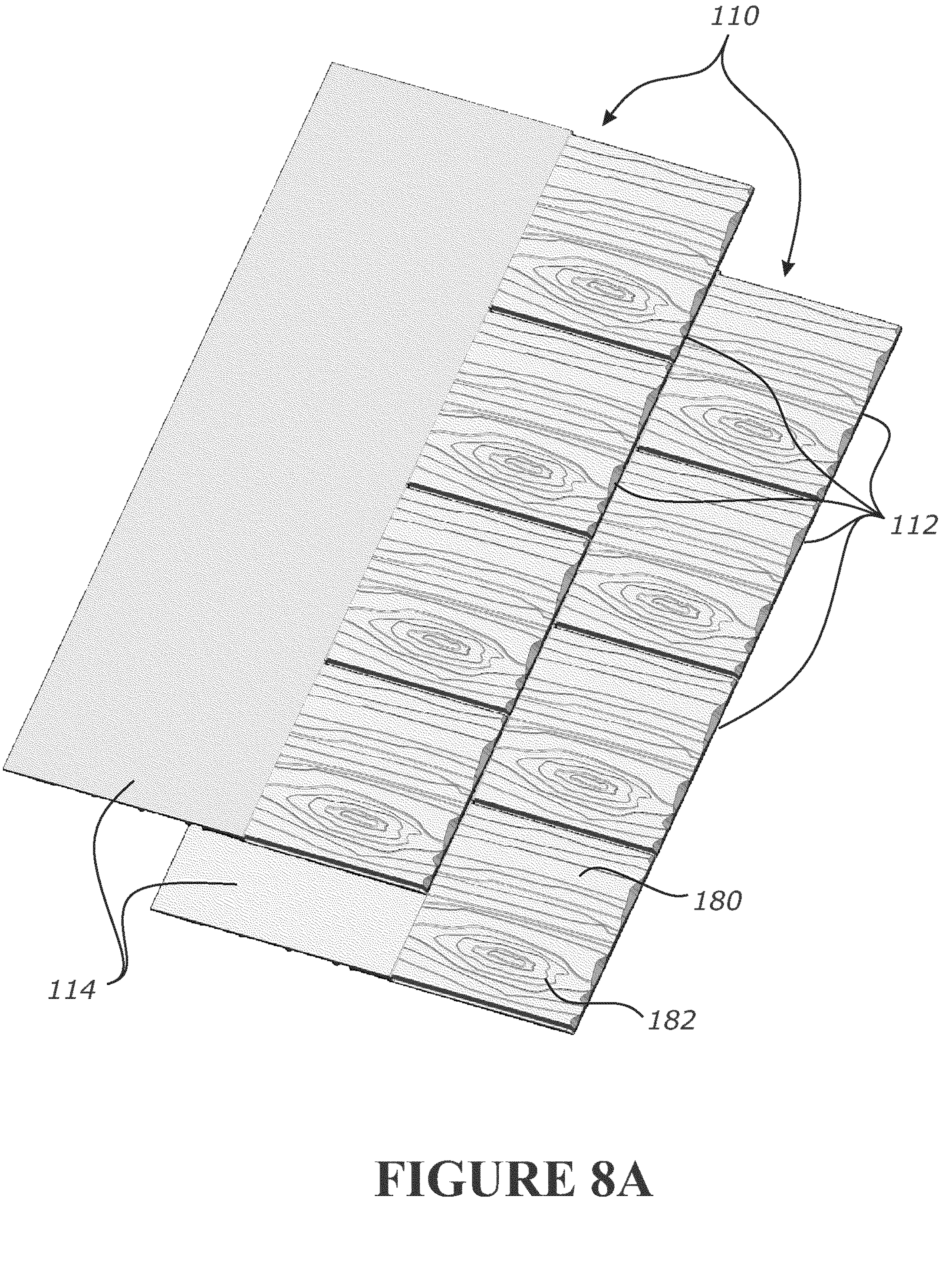
FIGS. 8A, 8B and 8C show an example of a moulded article with structures of a non-presentation side surface providing or contributing a pre-determined surface decoration on a presentation side surface.
Figure 8B:
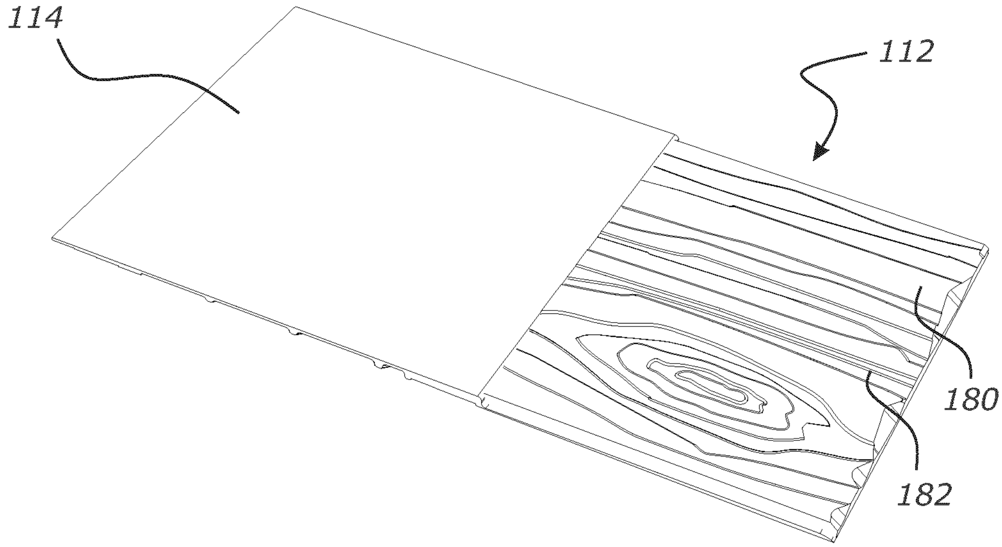
Figure 8C:
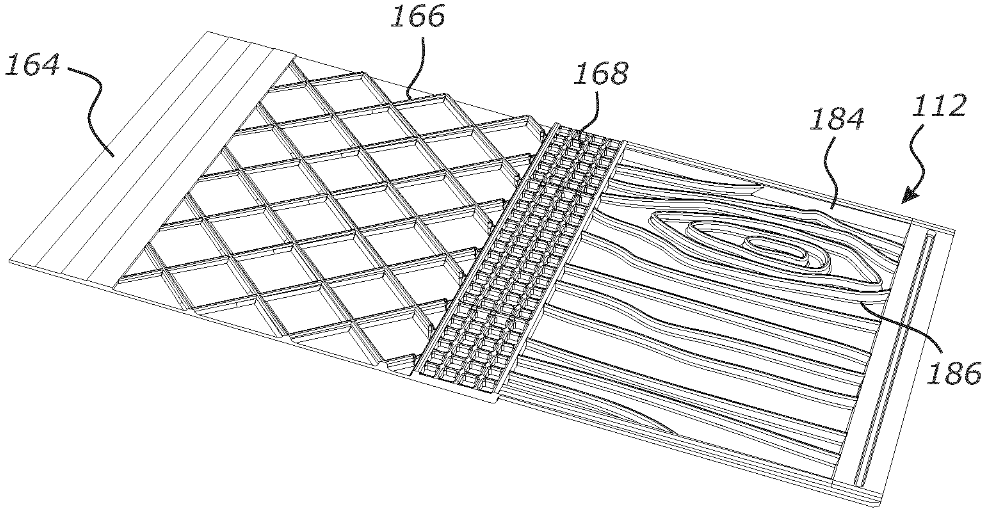

FIGS. 8A, 8B and 8C show an alternative example embodiment of a moulded article with reinforcement features imparting onto a presentation side surface, forming a wood shake type pre-determined surface decoration. In an example embodiment, moulded article 110 may comprise at least one tab 112, including a presentation side surface 180, and a pre-determined surface decoration 182.

As described above in relation to FIGS. 2A-C and FIGS. 3A-C, the example embodiment of FIGS. 8A-C may include a reinforcement side surface 184, comprising reinforcement features 186. In an example, the reinforcement features 186 may be disposed or arranged such that they impart an enhancement to the pre-determined surface decoration 182 of the presentation side surface 180. For example, the reinforcement features 186 or support structures may be configured, disposed or arranged to impart a pattern or decoration to the presentation side surface 180.

In an example embodiment, the outer surface of the presentation side surface as described herein may comprise a photovoltaic cell or device. In one embodiment, the moulded article 110 may comprise a solar radiation transmissible film which is overlaid upon the photovoltaic cell.

In an example embodiment, the moulded article or module 110 may be moulded from one or more polymeric materials. In one example, the one or more polymeric materials are selected from the group consisting of polycarbonate, foamed polycarbonate, thermoplastic polyurethane (TPU), thermoplastic polyolefin (TPO), polyvinyl chloride (PVC), aquilobutalstyrene (ABS), styrene-acrylonitrile resin (SAN), thermoplastic rubber, and any other amorphous or crystalline polymer or combination of polymers. In one example, the one or more polymeric materials are flame retardant. In one example, the one or more polymeric materials are weather, hail, ultraviolet, tear, mould and impact resistant.

In an example, the moulded article 110 may comprise multiple layers of polymeric material, wherein the layers are of the same or different polymeric material. In one embodiment, at least one material has high UV resistance. In one example, at least one material has high thermal conductivity. In one example, the moulded article 110 further comprises a reinforcement layer.

In one example, the moulded article 110 or the polymer layers can be coloured or comprise a blend of colours. In one example, the polymer on the outer layer of the moulded article 110 can be manufactured to mimic traditional roofing products.

In one example, the reinforcement side surface is profiled to define one or more regions for fixing by a penetrative fastener, for example region 168 shown in FIGS. 6A and 8C. In one example, the one or more regions for fixing by a penetrative fastener are adapted to receive a nail or screw gun head to accurately locate the fixing.

In some embodiments, the moulded article 110 is manufactured by a continuous forming process, for example as described in International patent publication WO2016/088026, the contents of which is incorporated herein by reference.

Alternatively, in some embodiments the moulded article 110 is formed by injection moulding, die casting, extrusion, pressing, heating, pressing and heating (for example with a ceramic material), casting (for example with a metal material), or any other suitable known forming process In a further aspect, the invention provides a roofing shingle, tile or equivalent module 110 ("shingle") substantially as herein described, with or without reference to the accompanying drawings.

In a further aspect, the invention provides a building surface clad by cladding or siding components of any aspect of the present invention.

Prior art moulded articles are designed to mitigate or avoid differential shrinkage of material. Advantageously, the invention as described herein may provide for the provision of pre-determined surface decoration features, where one or more reinforcement features, which may contribute to differential shrinkage, are provided in a complementary manner of the decoration features.

Clause 1. A moulded article providing for a presentation side surface and a non-presentation side surface, wherein the presentation side surface provides for a pre-determined surface decoration, and the non-presentation side surface is a substantially opposing face to the presentation side surface, wherein the non-presentation side surface comprises one or more structure(s), the one or more structure(s) arranged or positioned to substantially provide or contribute the pre-determined surface decoration of the presentation side surface.

Clause 2. The moulded article of clause 1, wherein the non-presentation side surface is a reinforcement side surface.

Clause 3. The moulded article of clause 1 or clause 2, wherein the presentation side surface comprises of one or more pre-determined surface decoration feature(s).

Clause 4. The moulded article of clause 3, wherein the one or more structure(s) are arranged about the non-presentation side surface in a substantially complementary manner of the one or more pre-determined surface decoration feature(s) of the presentation side surface.

Clause 5. The moulded article of any one of clauses 1-4, wherein the one or more structure(s) is one or more reinforcement feature(s).

Clause 6. The moulded article of any one of clauses 1-5, wherein the one or more structure(s) is/are substantially solid, substantially partially solid or partially hollow type structure, or substantially hollow type structure.

Clause 7. The moulded article of any one of clauses 1-6, wherein the presentation side surface provides for one or more pre-determined surface decoration feature(s), and the non-presentation side surface (such as a reinforcement side surface) is a substantially opposing face to the presentation side surface, wherein the non-presentation side surface (such as the reinforcement side surface) comprises one or more structure(s) (such as one or more reinforcement feature(s)), the one or more structure(s) (such as the one or more reinforcement feature(s)) arranged in a substantially complementary manner of one or more of the pre-determined surface decoration feature(s) of the presentation side surface.

Clause 8. A moulded article providing for a presentation side surface and a reinforcement side surface, wherein the presentation side surface provides for pre-determined surface decoration feature(s), and the reinforcement side surface is a substantially opposing face to the presentation side surface, wherein the reinforcement side surface comprises one or more reinforcement feature(s), the one or more reinforcement feature(s) arranged in a substantially complementary manner of one or more of the pre-determined surface decoration feature(s) of the presentation side surface.

Clause 9. The moulded article of any one of clauses 1-8, wherein the reinforcement feature(s) comprise one or more stand-offs, or ribs, or thickened portions (including but not limited to dimples or feet type structures) extending from the reinforcement side surface.

Clause 10. The moulded article of clause 9, wherein the stand-offs, or ribs, or thickened portions (including but not limited to dimples or feet type structures) vary in one or more of a height and/or width and/or length and/or position to complement one or more of the decoration feature(s) of the presentation side surface.

Clause 11. The moulded article of any one of clauses 1-10, wherein the presentation side surface comprises a non-presentation portion, the non-presentation portion configured to be substantially covered by at least a portion of a second or further moulded article.

Clause 12. The moulded article of any one of clauses 1-11, wherein the presentation side surface comprises an underlapping region and an overlapping region, the overlapping region including the decoration feature(s) of the presentation side surface, and configured to overlap the underlapping region of a second or further moulded article.

Clause 13. The moulded article of any one of clauses 1-12, wherein the reinforcement feature(s) are provided about the reinforcement side surface in a manner to substantially transpose or impart or influence the topology of the presentation side surface.

Clause 14. The moulded article of any one of clauses 1-13, wherein the reinforcement feature(s) are substantially aligned with decoration feature(s) of the presentation side surface or are arranged about the reinforcement side surface in a manner so as to substantially complement or accentuate one or more of the decoration feature(s) of the presentation side surface.

Clause 15. The moulded article of any one of clauses 1-14, wherein a positioning of the pre-determined surface decoration feature(s) and/or the reinforcement feature(s) provides for a compensation for a differential shrinkage rate of one or more portions of the moulded article.

Clause 16. The moulded article of any one of clauses 1-15, wherein the moulded article is formed of a mouldable material, such as, but not limited to one or more of: polymeric materials, plastics, glass, ceramics, metals.

Clause 17. The moulded article of any one of clauses 1-16, wherein the moulded article is formed via a continuous forming process.

Clause 18. The moulded article of any one of clauses 1-17, wherein the reinforcement feature(s) are provided to be of a sufficient height or extension from the reinforcement side surface so as to:

make contact with a surface upon which the one or more reinforcement feature(s) are to be supported upon, such as a building surface, and/or not make contact, or avoids contact, with a surface upon which the one or more reinforcement feature(s) are to be supported upon, such as a building surface, and/or a combination of the above.

Clause 19. The moulded article of any one of clauses 1-18, wherein the reinforcement feature(s) comprise a plurality of discontinuous rib portions arranged about the reinforcement side.

Clause 20. The moulded article of any one of clauses 1-19, wherein the reinforcement feature(s) comprise a plurality of continuous rib portions arranged about the reinforcement side, extending substantially continuously about the reinforcement side.

Clause 21. The moulded article of any one of clauses 1-20, wherein the reinforcement feature(s) are a series of rib portions.

Clause 22. The moulded article of any one of clauses 1-21, wherein the reinforcement feature(s) are a series of inter-connecting rib portions.

Clause 23. The moulded article of any one of clauses 1-22, wherein the reinforcement feature(s) are configured or arranged about the reinforcement side to mimic a desired decoration or appearance of the presentation side.

Clause 24. The moulded article of clause 23, wherein the desired decoration or appearance of the presentation side is at least one or more of: a natural material surface finish or appearance, such as natural products, slate, wood or wooden grain (or split wood, such as a wooden shingle), animal skin (such as leather), stone, bark, leaves, plants (or vegetation), flowers.

Clause 25. The moulded article of clause 23, wherein the desired decoration or appearance of the presentation side is at least one or more of: a man-made shape, a material surface finish or appearance, such as man-made products, asphalt, shingle, wood or wood grain, stone or stone chips, cloth or woven material, glass, dimpled glass, carbon fibre or other fibrous appearance materials, glass fibre, matting, metal.

Clause 26. The moulded article of any one of clauses 1-25, wherein the moulded article is configured to be one or more of:

not joined together or not in contact with another moulded article, substantially adjacent to, or abutting of, another moulded article, provided as an individual surface, provided as a complete surface or a component part surface, provided as part of or an accent to a surface, provided as part of a change in a surface.

Clause 27. A roofing or siding shingle or module comprising of a plurality of said moulded articles as defined in any one of clauses 1-26, wherein the plurality of moulded articles are enjoined with each other via the shingle or module as a unit providing for a plurality of individual or separately presentable surfaces, each presentable surface comprising of a different arrangement or patterning of reinforcement feature(s) on the reinforcement side surface in a manner to complementarily support the shingle or module upon a surface and the decoration feature(s) of the presentation side surface.

Clause 28. The roofing or siding shingle or module of clause 27, wherein each said moulded article is formed of substantially the same quantity or volume of mouldable material.

Clause 29. The roofing or siding shingle or module of clause 27 or clause 28, wherein each said moulded article of the plurality of moulded articles of a said module, provide for a substantially unique presentation side surface and non-presentation side surface.

Clause 30. A system of a plurality of shingle or modules as defined in any one of clauses 27-29, wherein the plurality of shingles or modules are arranged as an array of substantially overlapping shingles or tiles to provide coverage of a surface to which the shingle or modules are to be affixed or supported therefrom.

Where, in the foregoing description reference has been made to integers or components having known equivalents thereof, those integers are herein incorporated as if individually set forth.

Although the present disclosure has been described in terms of certain embodiments, other embodiments apparent to those of ordinary skill in the art also are within the scope of this disclosure. Thus, various changes and modifications may be made without departing from the spirit and scope of the disclosure. For instance, various components may be repositioned as desired. Moreover, not all of the features, aspects and advantages are necessarily required to practice the present disclosure. Accordingly, the scope of the present disclosure is intended to be defined only by the claims that follow.

What is claimed is:

1. A moulded article providing for a presentation side surface and a non-presentation side surface, wherein the presentation side surface provides for a pre-determined surface decoration, and the non-presentation side surface is a substantially opposing face to the presentation side surface, wherein the non-presentation side surface comprises one or more structure(s), the one or more structure(s) arranged or positioned to substantially provide or contribute the pre-determined surface decoration of the presentation side surface, and wherein the presentation side surface provides for one or more pre-determined surface decoration feature(s), and wherein the one or more structures of the non-presentation side surface are arranged in a substantially complementary manner of one or more of the pre-determined surface decoration features of the presentation side surface.

2. The moulded article of claim 1, wherein the non-presentation side surface is a reinforcement side surface.

3. The moulded article of claim 1, wherein the presentation side surface comprises of one or more pre-determined surface decoration feature(s).

4. The moulded article of claim 3, wherein the one or more structure(s) are arranged about the non-presentation side surface in a substantially complementary manner of the one or more pre-determined surface decoration feature(s) of the presentation side surface.

5. The moulded article of claim 1, wherein the one or more structure(s) is/are one or more reinforcement feature(s).

6. The moulded article of claim 1, wherein the one or more structure(s) is/are substantially solid, substantially partially solid or partially hollow type structure, or substantially hollow type structure.

7. The moulded article of claim 1, wherein the non-presentation side surface comprises one or more reinforcement feature(s), arranged in a substantially complementary manner of one or more of the pre-determined surface decoration feature(s) of the presentation side surface.

8. A moulded article providing for a presentation side surface and a reinforcement side surface, wherein the presentation side surface provides for pre-determined surface decoration feature(s), and the reinforcement side surface is a substantially opposing face to the presentation side surface, wherein the reinforcement side surface comprises one or more reinforcement feature(s), the one or more reinforcement feature(s) arranged in a substantially complementary manner of one or more of the pre-determined surface decoration feature(s) of the presentation side surface.

9. The moulded article of claim 8, wherein the reinforcement feature(s) comprise one or more stand-offs, or ribs, or thickened portions or dimples or feet type structures extending from the reinforcement side surface.

10. The moulded article of claim 9, wherein the stand-offs, or ribs, or thickened portions or dimples or feet type structures vary in one or more of a height and/or width and/or length and/or position to complement one or more of the decoration feature(s) of the presentation side surface.

11. The moulded article of claim 1, wherein the presentation side surface comprises a non-presentation portion, the non-presentation portion configured to be substantially covered by at least a portion of a second or further moulded article.

12. The moulded article of claim 1, wherein the presentation side surface comprises an underlapping region and an overlapping region, the overlapping region including the decoration feature(s) of the presentation side surface, and configured to overlap the underlapping region of a second or further moulded article.

13. The moulded article of claim 1, wherein the reinforcement feature(s) are provided about the reinforcement side surface in a manner to substantially transpose or impart or influence the topology of the presentation side surface.

14. The moulded article of claim 1, wherein the reinforcement feature(s) are substantially aligned with decoration feature(s) of the presentation side surface or are arranged about the reinforcement side surface in a manner so as to substantially complement or accentuate one or more of the decoration feature(s) of the presentation side surface.

15. The moulded article of claim 1, wherein a positioning of the pre-determined surface decoration feature(s) and/or the reinforcement feature(s) provides for a compensation for a differential shrinkage rate of one or more portions of the moulded article.

16. The moulded article of claim 1, wherein the moulded article is formed of a mouldable material, such as, one or more of: polymeric materials, plastics, glass, ceramics, metals.

17. The moulded article of claim 1, wherein the moulded article is formed via a continuous forming process.

18. The moulded article of claim 1, wherein the reinforcement feature(s) are provided to be of a sufficient height or extension from the reinforcement side surface so as to:

make contact with a surface upon which the one or more reinforcement feature(s) are to be supported upon, such as a building surface, and/or not make contact, or avoids contact, with a surface upon which the one or more reinforcement feature(s) are to be supported upon, such as a building surface, and/or a combination of the above.

19. The moulded article of claim 1, wherein the reinforcement feature(s) comprise a plurality of discontinuous rib portions arranged about the reinforcement side.

20. The moulded article of claim 1, wherein the reinforcement feature(s) comprise a plurality of continuous rib portions arranged about the reinforcement side, extending substantially continuously about the reinforcement side.

21. The moulded article of claim 1, wherein the reinforcement feature(s) are a series of rib portions.

22. The moulded article of claim 1, wherein the reinforcement feature(s) are a series of inter-connecting rib portions.

23. The moulded article of claim 1, wherein the reinforcement feature(s) are configured or arranged about the reinforcement side to mimic a desired decoration or appearance of the presentation side.

24. The moulded article of claim 23, wherein the desired decoration or appearance of the presentation side is at least one or more of:

a natural material surface finish or appearance,
a slate finish,
a wood finish,
a wooden grain finish,
a split wood finish,
a wooden shingle finish,
an animal skin finish,
a leather finish,
a stone finish,
a bark finish,
a leaf finish,
a plant finish, or
a flower finish.

25. The moulded article of claim 23, wherein the desired decoration or appearance of the presentation side is at least one or more of: a man-made shape, a material surface finish or appearance, a man-made product, asphalt, shingle, wood or wood grain, stone or stone chips, cloth or woven material, glass, dimpled glass, carbon fibre or other fibrous appearance materials, glass fibre, matting, metal.

26. The moulded article of claim 1, wherein the moulded article is configured to be one or more of:

not joined together or not in contact with another moulded article,
substantially adjacent to, or abutting of, another moulded article,
provided as an individual surface,
provided as a complete surface or a component part surface,
provided as part of or an accent to a surface, or
provided as part of a change in a surface.

27. A roofing or siding shingle or module comprising of a plurality of said moulded articles as defined in claim 1, wherein the plurality of moulded articles are enjoined with each other via the shingle or module as a unit providing for a plurality of individual or separately presentable surfaces, each presentable surface comprising of a different arrangement or patterning of reinforcement feature(s) on the reinforcement side surface in a manner to complementarily support the shingle or module upon a surface and the decoration feature(s) of the presentation side surface.

28. The roofing or siding shingle or module of claim 27, wherein each said moulded article is formed of substantially the same quantity or volume of mouldable material.

29. The roofing or siding shingle or module of claim 27, wherein each said moulded article of the plurality of moulded articles of a said module, provide for a substantially unique presentation side surface and non-presentation side surface.

30. A system of a plurality of shingle or modules as defined in claim 27, wherein the plurality of shingles or modules are arranged as an array of substantially overlapping shingles or tiles to provide coverage of a surface to which the shingle or modules are to be affixed or supported therefrom.

* * * * *